(12) United States Patent
Halasa et al.

(10) Patent No.: US 7,943,712 B2
(45) Date of Patent: May 17, 2011

(54) CATALYST SYSTEM FOR SYNTHESIZING AMINE FUNCTIONALIZED RUBBERY POLYMERS HAVING A HIGH TRANS MICROSTRUCTURE

(75) Inventors: Adel Farhan Halasa, Bath, OH (US); Wen-Liang Hsu, Cuyahoga Falls, OH (US); Laurie Elizabeth Austin, Hartville, OH (US); Chad Aaron Jasiunas, Copley, OH (US); Steven Kristofer Henning, Downingtown, PA (US)

(73) Assignee: The Goodyear Tire & Rubber Company, Akron, OH (US)

( * ) Notice: Subject to any disclaimer, the term of this patent is extended or adjusted under 35 U.S.C. 154(b) by 259 days.

(21) Appl. No.: 11/617,361

(22) Filed: Dec. 28, 2006

(65) Prior Publication Data
US 2008/0161518 A1 Jul. 3, 2008

(51) Int. Cl.
C08F 4/50 (2006.01)
C08F 2/06 (2006.01)
C07F 7/08 (2006.01)

(52) U.S. Cl. ........ 526/180; 526/177; 526/176; 526/187; 526/188; 526/189; 526/335; 526/340; 526/340.2; 502/154; 502/102; 152/209.1

(58) Field of Classification Search ............... 526/177, 526/180; 502/102, 154; 152/209.1
See application file for complete search history.

(56) References Cited

U.S. PATENT DOCUMENTS

| | | | |
|---|---|---|---|
| 3,992,561 A | 11/1976 | Hargis et al. | |
| 4,929,679 A | 5/1990 | Akita et al. | |
| 4,935,471 A * | 6/1990 | Halasa et al. | 525/359.1 |
| 5,100,965 A | 3/1992 | Hsu et al. | |
| 5,239,023 A * | 8/1993 | Hsu et al. | 526/141 |
| 5,262,213 A | 11/1993 | Rodgers et al. | |
| 5,300,577 A | 4/1994 | DiRossi et al. | |
| 5,332,810 A | 7/1994 | Lawson et al. | |
| 5,356,997 A * | 10/1994 | Massie et al. | 525/237 |
| 5,519,086 A | 5/1996 | Lawson et al. | |
| 5,523,364 A | 6/1996 | Engel et al. | |
| 5,527,860 A | 6/1996 | Yamakawa et al. | |
| 5,679,751 A | 10/1997 | Halasa et al. | |
| 5,753,579 A | 5/1998 | Jalics et al. | |
| 5,866,650 A | 2/1999 | Lawson et al. | |
| 5,883,183 A * | 3/1999 | Kitamura et al. | 524/575 |
| 5,916,961 A | 6/1999 | Hergenrother et al. | |
| 5,932,662 A | 8/1999 | Lawson et al. | |
| 5,935,893 A * | 8/1999 | Lawson et al. | 502/157 |
| 6,046,288 A * | 4/2000 | Lawson et al. | 526/175 |
| 6,103,842 A | 8/2000 | Halasa et al. | |
| 6,624,267 B1 | 9/2003 | Favrot et al. | |
| 6,627,715 B2 | 9/2003 | Halasa et al. | |
| 6,800,582 B2 | 10/2004 | Favrot et al. | |
| 6,889,737 B2 | 5/2005 | Weydert et al. | |
| 6,891,019 B2 * | 5/2005 | Brockmann et al. | 528/422 |
| 7,019,084 B2 | 3/2006 | Sandstrom | |
| 7,321,017 B1 * | 1/2008 | Halasa et al. | 526/180 |
| 2002/0183469 A1 | 12/2002 | Halasa et al. | |
| 2003/0139563 A1 | 7/2003 | Brockmann et al. | |
| 2003/0153698 A1 | 8/2003 | Halasa et al. | |
| 2004/0249020 A1 | 12/2004 | Sandstrom et al. | |
| 2005/0272852 A1 | 12/2005 | Sandstrom et al. | |
| 2006/0091569 A1 | 5/2006 | Emmel et al. | |
| 2007/0037956 A1 * | 2/2007 | Hogan et al. | 528/125 |

FOREIGN PATENT DOCUMENTS

EP 1285932 2/2003

OTHER PUBLICATIONS

European Patent Office, European Search Report in EP Application No. 07123587.3, Mar. 26, 2008, 5 pgs.
European Patent Office, Search Report in EP Application Serial No. 07123584.0-2109, Mar. 26, 2008. 4 pages.
U.S. Patent and Trademark Office, Non-Final Official Action in corresponding U.S. Appl. No. 11/616,986 dated Feb. 20, 2009, 35 pp.
U.S. Patent and Trademark Office, Final Official Action in corresponding U.S. Appl. No. 11/616,986 dated Sep. 22, 2009, 30 pp.

* cited by examiner

Primary Examiner — Patrick Ryan
Assistant Examiner — Ladan Mohaddes
(74) Attorney, Agent, or Firm — Wood, Herron & Evans, LLP

(57) ABSTRACT

The present invention is directed to a catalyst system for synthesizing rubbery polymers, such as polybutadiene rubber, styrene-butadiene rubber, isoprene-butadiene rubber, or styrene-isoprene-butadiene rubber, that are amine functionalized and have a high trans microstructure. The catalyst system, in one embodiment, includes (a) an organolithium amine compound, (b) a group IIa metal salt of an amino glycol or a glycol ether, (c) an organoaluminum compound, and optionally (d) an amine compound. The amine functionalized rubbery polymers can be utilized in tire tread rubbers where the rubbery polymers may provide desirable wear properties without substantially sacrificing other performance characteristic(s), e.g., traction properties.

11 Claims, No Drawings

CATALYST SYSTEM FOR SYNTHESIZING AMINE FUNCTIONALIZED RUBBERY POLYMERS HAVING A HIGH TRANS MICROSTRUCTURE

CROSS-REFERENCE

The present invention is related to U.S. Ser. No. 11/616, 986, filed Dec. 28, 2006, and entitled "Catalyst System for Synthesizing Amine Functionalized Rubbery Polymers".

FIELD OF THE INVENTION

The present invention is directed to a catalyst system containing an organolithium amine compound for synthesizing rubbery polymers having a high trans microstructure content that can be utilized in tire tread rubbers.

BACKGROUND OF THE INVENTION

It is desirable for tires to have good wet skid resistance, low rolling resistance, tear strength, and good wear characteristics. It has traditionally been difficult to improve the wear characteristics of a tire without sacrificing wet skid resistance and traction characteristics. These properties depend, to a great extent, on the dynamic viscoelastic properties of the rubbers utilized in making the tire. Such viscoelastic properties are controlled largely by the microstructure of the elastomer.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers that undergo a large energy loss have generally been utilized in the tread of the tire. In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads.

It has been generally conventionally believed to be desirable, e.g., for styrene-butadiene rubber, when utilized in tire tread compounds, to have a high level of vinyl content (1,2-microstructure). To this end, styrene-butadiene rubbers are often synthesized by solution polymerization that is conducted in the presence of a catalyst system, including one or more modifying agents. In contrast to providing high vinyl content rubbery polymers, it is believed that rubbery polymers having high trans microstructure contents may provide a more desirable balance of tire tread properties.

In addition, to further alter or manipulate the properties of rubbery polymers, and thus the characteristics of a tire utilizing such rubbery polymer, various functional groups can be incorporated into the rubbery polymer. Unfortunately, due to the unpredictable interactions of the various compounds and chemicals used for synthesizing and compounding these rubbery polymers, it can be challenging to formulate useful functionalized rubber compounds that provide tires with overall desirable performance characteristics.

It is thus desirable to provide a catalyst system for synthesizing rubbery polymers that are amine functionalized and have a high trans microstructure content, wherein the rubbery polymers can provide desirable wear properties without substantially sacrificing other performance characteristic(s), e.g., traction properties.

SUMMARY OF THE INVENTION

In accordance with an embodiment of the present invention, a catalyst system is provided which includes (a) an organolithium amine compound, (b) a group IIa metal salt that can be selected from the group consisting of group IIa metal salts of amino glycol or group IIa metal salts of glycol ethers, (c) an organoaluminum compound, and optionally (d) an amine compound or other polar modifiers, such as alcohols, sulfides, and phosphenes.

The catalyst system catalyzes the polymerization of one or more different types of conjugated diene monomers optionally with vinyl aromatic monomers into rubbery polymers, such as styrene-butadiene rubber, that are amine functionalized and have a high trans microstructure content. High trans amine functionalized rubbery polymers that are synthesized using the catalyst system of this invention are useful in the preparation of tire tread rubber compounds, which can exhibit improved wear and tear characteristics, particularly when such tread compounds contain silica.

By virtue of the foregoing, there is thus provided a catalyst system, which contains an organolithium amine compound, for synthesizing rubbery polymers, such as polybutadiene rubber, styrene-butadiene rubber, isoprene-butadiene rubber, or styrene-isoprene-butadiene rubber, that are amine functionalized and have a high trans microstructure content, wherein the rubbery polymers provide desirable wear properties without substantially sacrificing other performance characteristic(s), e.g., traction properties.

DETAILED DESCRIPTION

A catalyst system is provided which includes (a) an organolithium amine compound, (b) a group IIa metal salt such as a group IIa metal salt of amino glycol or a group IIa metal salt of glycol ethers, (c) an organoaluminum compound, and optionally (d) an amine compound or other polar modifiers, such as alcohols, sulfides, and phosphenes. The catalyst system synthesizes rubbery polymers, such as polybutadiene rubber, styrene-butadiene rubber, isoprene-butadiene rubber, or styrene-isoprene-butadiene rubber, that are functionalized and have a high trans microstructure content that can be utilized in tire tread rubbers, wherein the polymerizations typically are carried out in a hydrocarbon solvent, as further discussed in detail below.

The organolithium amine compound, i.e., the amine functionalized organolithium compound, of the catalyst system is selected from compounds having the following formulas: (I) $(R)_2N$—R"—Li, (II) (R)NH—R"—Li, or (III) R'N—R"—Li, wherein R is a monovalent hydrocarbyl group that has 1 to 12 carbons and is the same or different in formula (I), wherein R', together with the adjacent nitrogen, defines (1) a heterocyclic aromatic amine group having 2 to 18 ring carbon atoms, optionally, with one or more additional nitrogen atoms in the ring structure or (2) a heterocyclic non-aromatic amine group having 2 to 18 ring carbon atoms, optionally, with one or more additional nitrogen atoms in the ring structure, and wherein R" is a divalent hydrocarbyl group that has 1 to 20 carbons, with the proviso that the heterocyclic non-aromatic amine group excludes a 4 ring carbon atom when R" is propyl. In addition, it should be understood by one having ordinary skill in the art, that the nitrogen atom or NH in formula (II) may be replaced by sulfur, phosphorus, or oxygen where appropriate. In one example, the NH in formula (II) can replaced by oxygen or sulfur to provide, for example, ethoxypropyllithium or methylsulfidepropyllithium.

In one embodiment for formula (I), R is the same or different and is a monovalent hydrocarbyl group that has 1 to 4 carbons and R" is a divalent hydrocarbyl group that has 1 to 5 carbons. In another embodiment, R is the same or different and is a monovalent hydrocarbyl group that has 1 to 3 carbons and R" is a divalent hydrocarbyl group that has 1 to 3 carbons.

In another embodiment for formula (III), the heterocyclic aromatic amine group includes, for example, substituted or unsubstituted 3-, 4-, 5-, or 6-membered ring structures with one or more nitrogen atoms as part of the ring and R" is a divalent hydrocarbyl group that has 1 to 5 carbons.

Examples of the heterocyclic aromatic amine groups can include pyrrole, quinoline, pyridine, 2-picoline, 3-picoline, 4-picoline, pyridazine, pyrimidine, pyrazine, and others known to those having ordinary skill in the art. These compounds may also include fused ring structures.

In another embodiment for formula (III), the heterocyclic non-aromatic amine group has 5 to 18 ring carbon atoms with one or more additional nitrogen atoms in the ring structure. In yet another embodiment, the heterocyclic non-aromatic amine group includes, for example, substituted or unsubstituted 6- or 7-membered ring structures with one or more nitrogen atoms as part of the ring and R" is a divalent hydrocarbyl group that has 1 to 5 carbons.

Examples of the heterocyclic non-aromatic amine groups can include pyrrolidine, piperidine, hexamethyleneimine, piperazine, N,N-dimethyl piperazine, N-methyl piperazine, and others known to those having ordinary skill in the art. These compounds may also include fused ring structures.

Concerning the organolithium amine initiator compound, in one example, the heterocyclic non-aromatic amine group is an unsubstituted 7-membered ring structure with one nitrogen atom as part of the ring, i.e., a hexamethyleneimine group, and R" defines a propyl group so that the organolithium amine initiator compound is hexamethylene-iminopropyllithium. In another example, the heterocyclic non-aromatic amine group is an unsubstituted 6-membered ring structure with one nitrogen atom as part of the ring, i.e., a piperidine group, and R" defines a propyl group so that the organolithium amine initiator compound is piperidinopropyllithium. In an example for formula (I), each R defines an ethyl group and R" defines a propyl group so that the organolithium amine initiator compound is diethylamino-propyllithium. In another example for formula (I), each R defines a methyl group and R" defines a propyl group so that the organolithium amine initiator compound is dimethylaminopropyllithium. The choice of specific initiator in the catalyst system can be governed by the degree of branching and the degree of elasticity desired for the polymer, the nature of the feedstock, and the like.

The organolithium amine compound can be prepared by reacting an organomonolithium and an amine group by methods and means known to those having ordinary skill in the art, as generally described in U.S. Pat. Nos. 4,935,471 and 5,932,662, both of which are incorporated herein by reference in their entireties. Such a reaction typically is conducted in an inert diluent, for example, a hydrocarbon or a mixture of a hydrocarbon and a polar organic compound. The reaction may be conducted in the presence of a minor amount of solubilizing monomer, such as a conjugated diene monomer, e.g., butadiene.

The group IIa metal salts used in the catalyst systems can be selected from group IIa metal salts of amino glycols or group IIa metal salts of glycol ethers. The group IIa metal salts of amino glycols may be represented by the structural formula:

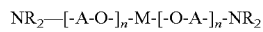

wherein the R groups can be the same or different and represent alkyl groups (including cycloalkyl groups), aryl groups, alkaryl groups or arylalkyl groups; wherein M represents a group IIa metal selected from beryllium, magnesium, calcium, strontium, or barium; wherein n represents an integer from 2 to about 10; and wherein A represents an alkylene group that contains from about 1 to about 6 carbon atoms. In one example, M represents strontium or barium. In another example, M represents barium. In one example, A represents an alkylene group that contains from 2 to about 4 carbon atoms. In another example, A represents an ethylene group that contains from 2 to about 4 carbon atoms. In cases where R represents an alkyl group, the alkyl group will typically contain from 1 to about 12 carbon atoms. In one example, the R represents an alkyl group that contains from about 1 to about 8 carbon atoms or a cycloalkyl group that contains from about 4 to about 8 carbon atoms. In another example, R represents an alkyl group that contains from about 1 to about 4 carbon atoms. In another example, n represents an integer from about 2 to about 4. In cases where R represents an aryl group, an alkaryl group, or arylalkyl group, the aryl group, alkaryl group, or arylalkyl group will typically contain from about 6 to about 12 carbon atoms.

In cases where R represents cycloalkyl groups, the group IIa metal salt will be of the structural formula:

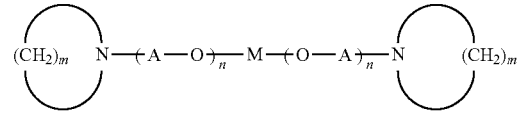

wherein m represents an integer from 4 to about 8; wherein n represents an integer from 2 to about 10; wherein M represents a group IIa metal selected from beryllium, magnesium, calcium, strontium, or barium; wherein A represents an alkylene group that contains from about 1 to about 6 carbon atoms, and wherein the A groups can be the same or different. In one example, m represents an integer from 5 to about 7, n represents an integer from about 2 to about 4, A represents an alkylene group that contains from 2 to about 4 carbon atoms. In another example, A represents ethylene groups. In another example, M represents strontium or barium. In yet another example, M represents barium.

Some representative examples of barium salts where R represents cycloalkyl groups include:

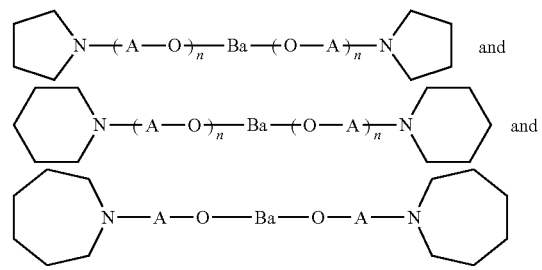

wherein A represents ethylene groups, wherein the A groups can be the same or different, and wherein n represents the integer 2.

The barium salt can also contain a cycloalkyl group that contains an oxygen atom. For example, the barium salt can be of the structural formula:

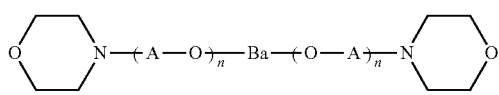

wherein A represents ethylene groups, wherein the A groups can be the same or different, and wherein n represents the integer 2.

The group IIa metal salt of glycol ethers may be represented by the structural formula:

wherein M represents a group IIa metal selected from beryllium, magnesium, calcium, strontium, or barium; wherein n represents an integer from 2 to 10; wherein m represents an integer from 1 to 6; and wherein x represents an integer from 1 to 12. In one example, n represents an integer from 2 to about 4, m represents an integer from 2 to 8, and x represents an integer from 1 to 8. In another example, n represents an integer from 2 to 3, m represents an integer from 2 to 4, and x represents an integer from 1 to 4. In another example, M represents strontium or barium. In yet another example, M represents barium.

In another embodiment, the group IIa metal salt is the barium salt of di(ethyleneglycol)ethyl ether which is of the structural formula:

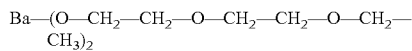

In another embodiment, the group IIa metal salt is

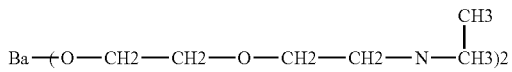

In other embodiments, the group IIa metal salts include barium salts of tri(ethyleneglycol)ethyl ethers and barium salts of tetra(ethyleneglycol) ethyl ethers.

The molar ratio of the organolithium compound to the group IIa metal salt will typically be within the range of about 0.1:1 to about 20:1. In one example, the molar ratio is within the range of 0.5:1 to about 15:1. In another example, the molar ratio of the organolithium compound to the group IIa metal salt is within the range of about 1:1 to about 6:1. In yet another example, the molar ratio is within the range of about 2:1 to about 4:1.

The organolithium compound will normally be present in the polymerization medium in an amount that is within the range of about 0.01 to about 1.5 phm (parts by 100 parts by weight of total monomer). In one example, from about 0.01 phm to about 1.2 phm of the organolithium compound can be utilized. In another example, from about 0.025 phm to about 0.07 phm of the organolithium compound in the polymerization medium can be utilized.

The organoaluminum compounds of the catalyst system can be represented by the structural formula:

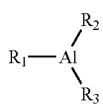

in which R1 is selected from alkyl groups (including cycloalkyl), aryl groups, alkaryl groups, arylalkyl groups, or hydrogen; R2 and R3 being selected from alkyl groups (including cycloalkyl), aryl groups, alkaryl groups, or arylalkyl groups. R1, R2, and R3, for example, can represent alkyl groups that contain from 1 to 8 carbon atoms. Some representative examples of organoaluminum compounds that can be utilized are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride and benzyl isopropyl aluminum hydride, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. The preferred organoaluminum compounds include tridodecylaluminum, tri-n-octylaluminum, tri-n-decylaluminum, triethyl aluminum (TEAL), tri-n-propyl aluminum, triisobutyl aluminum (TIBAL), trihexyl aluminum, and diisobutyl aluminum hydride (DIBA-H).

In one example, the organoaluminum compound can contain less than 13 carbon atoms. Such organoaluminum compounds include trimethylaluminum, triethylaluminum, tri-n-propylaluminum, tri-iso-propylaluminum, tri-isbutylaluminum, tri-t-butylaluminum, and tri-n-butylaluminum.

The molar ratio of the organoaluminum compound to the group IIa metal salt is within the range of about 0.1:1 to about 20:1. In another example, the molar ratio is from about 0.5:1 to about 15:1. In another example, the molar ratio of the organoaluminum compound to the group IIa metal salt is within the range of about 1:1 to about 8:1. In yet another example, the molar ratio is within the range of about 2:1 to about 6:1.

The organoaluminum compound will normally be present in the polymerization medium in an amount that is within the range of about 1.2 to about 2.0 phm (parts by 100 parts by weight of total monomer). In another example, from about 1.4 phm to about 1.8 phm of the organoaluminum compound can be utilized.

The catalyst system may also further optionally include an amine, which can include any suitable amine compound. In one embodiment, the amine compound can be selected from (1) a heterocyclic aromatic or non-aromatic compound which includes a ring structure with one or more nitrogen atoms as part of the ring; (2) an aromatic compound including a ring structure substituted with at least one amino group and at least one polar functionality containing group selected from a carboxyl group or a hydroxyl group; (3) a diamine compound; or (4) an aliphatic amine which includes a $C_1$-$C_{20}$ alkyl group.

The heterocyclic aromatic compounds, which are defined by a ring structure with one or more nitrogen atoms as part of the ring, can include, for example, substituted or unsubstituted 3-, 4-, 5-, or 6-membered ring structures with one or more nitrogen atoms as part of the ring. These compounds may include fused ring structures. Examples of the heterocyclic aromatic compounds can include pyrrole, quinoline, pyridine, 2-picoline, 3-picoline, 4-picoline, pyridazine, pyrimidine, pyrazine, and others known to those having ordinary skill in the art.

The heterocyclic non-aromatic compounds, which are defined by a ring structure with one or more nitrogen atoms as part of the ring, can include, for example, substituted or unsubstituted 3-, 4-, 5-, or 6-membered ring structures with one or more nitrogen atoms as part of the ring. These compounds may include fused ring structures. Examples of the heterocyclic non-aromatic compounds can include pyrolidine, piperidine, piperazine, N,N-dimethyl piperazine, N-methyl piperazine, and others known to those having ordinary skill in the art.

The aromatic compounds, which are defined by a ring structure substituted with at least one amine and at least one polar functionality containing group selected from a carboxyl group or a hydroxyl group, can include, for example, 3-, 4-, 5-, or 6-membered substituted rings, such substitution including at least one amino group and at least one polar functionality containing group selected from a carboxyl group or a hydroxyl group. In one example, the amine is a primary amine. These compounds also may include fused ring structures. Examples of the aromatic compound may include para-aminobenzoic acid (PABA), para-aminophenol (AP), as well as others known to those having ordinary skill in the art.

The diamine compounds can include aliphatic diamines or bicyclic chelating diamine compounds. The bicyclic chelating diamine compounds generally may be defined as two fused rings with at least one ring including two nitrogen atoms. For example, the bicyclic chelating diamine compound may include 1,4-diazabicyclo[2.2.2]octane (DABCO) and others known to those having ordinary skill in the art. The aliphatic diamines can include primary, secondary, or tertiary amines, or combinations thereof. In one example, the aliphatic diamine is an aliphatic bis-primary diamine, such as ethylene diamine or 1,3-diaminopropane. In yet another embodiment, the aliphatic diamines is an aliphatic bis-tertiary diamine, such as N,N,N',N'-tetramethylethylene diamine ("TMEDA").

The aliphatic amines, i.e., monoamines, which include a $C_1$-$C_{20}$ alkyl group, can include a primary, secondary, or tertiary amine. In one example, the aliphatic amine is a primary amine, such as octyl amine, n-butyl amine, or others known to those having ordinary skill in the art.

The molar ratio of the amine compound to the group IIa metal salt is within the range of about 0.1:1 to about 20:1. In another example, the molar ratio is from about 0.5:1 to about 15:1. In another example, the molar ratio of the amine compound to the group IIa metal salt is within the range of about 1:1 to about 8:1. In yet another example, the molar ratio is within the range of about 1:1 to about 6:1.

The amine compound will normally be present in the polymerization medium in an amount, which is within the range of about 0.20 to about 8.00 phm (parts by 100 parts by weight of total monomer).

Coupling agents also can be used when synthesizing the rubbery polymers to improve the cold flow characteristics of the rubber and rolling resistance of tires made therefrom. It also leads to better processability and other beneficial properties. A wide variety of compounds suitable for such purposes can be employed. Some representative examples of suitable coupling agents include: multivinylaromatic compounds, multiepoxides, multiisocyanates, multiimines, multialdehydes, multiketones, multihalides, multianhydrides, multiesters which are the esters of polyalcohols with monocarboxylic acids, and the diesters which are esters of monohydric alcohols with dicarboxylic acids, and the like.

As discussed above, the catalyst system synthesizes rubbery polymers that are amine functionalized and have a high trans microstructure content that can be utilized in tire tread rubbers, particularly in those treads containing silica fillers. The rubber polymers can be synthesized from one or more different types of conjugated diene monomers, such as 1,3-butadiene, isoprene, 2,3-dimethylbutadiene, and optionally vinyl aromatic monomers, such as vinyl, divinyl, or trivinyl benzene monomers, including styrene, α-methyl styrene, p-tertiary-butyl styrene, methyl vinyl toluene, p-vinyl toluene. In one embodiment, the rubbery polymer defines a homopolymer. In another embodiment, the rubbery polymer defines a copolymer or a terpolymer with at least one polymerized monomer selected from butadiene.

In one example, the monomer is 1,3 butadiene to provide a polybutadiene rubber, i.e., a homopolymer. In another example, the monomers include 1,3 butadiene and styrene or 1,3 butadiene and isoprene to provide, respectively, a styrene-butadiene rubber or isoprene-butadiene rubber, which are copolymers. In another example, the monomers include 1,3 butadiene, isoprene, and styrene to provide a styrene-isoprene-butadiene rubber, i.e., a terpolymer. For purposes herein, a rubbery polymer includes a high trans microstructure content if the trans microstructure content, e.g., trans 1,4 polybutadiene, of a polymerized conjugated diene monomer, such as 1,3 butadiene, is greater than 70% of its total microstructure content.

The polymerizations are typically carried out in a hydrocarbon solvent, such as one or more aromatic, paraffinic or cycloparaffinic compounds. The solvents generally will contain from 4 to 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, and petroleum naphtha, alone or in admixture. In the solution polymerizations, there typically will be from about 5 to about 30 weight percent monomers in the polymerization medium. Such polymerization media are comprised of the organic solvent and monomers. In another example, the polymerization medium may contain from about 10 to about 25 weight percent monomers. In yet another example, the polymerization medium can contain about 15 to about 20 weight percent monomers.

The copolymer rubbers derived from a conjugated diene monomer and a vinyl aromatic monomer will typically contain from about 2 weight percent to about 50 weight percent vinyl aromatic monomer, such as styrene, and from about 50 weight percent to about 98 weight percent conjugated diene monomer, such as 1,3-butadiene. However, in some cases, the amount of vinyl aromatic monomer included will be as low as about 1 weight percent. In another example, the copolymer rubbers will contain from about 3 weight percent to about 30 weight percent vinyl aromatic monomer and from about 70 weight percent to about 97 weight percent 1,3-conjugated diene monomer.

The copolymer rubbers derived from two different conjugated diene monomers, with one monomer being butadiene, will typically contain from about 50 weight percent to about 98 weight percent 1,3-butadiene and from about 2 weight percent to about 50 weight percent other conjugated diene monomer, such as isoprene. However, in some cases, the amount of other conjugated diene monomer included will be as low as about 1 weight percent.

The terpolymer rubbers derived from at least two different conjugated diene monomers, with one monomer being butadiene, and a vinyl aromatic monomer will typically contain from about 50 weight percent to about 98 weight percent 1,3-butadiene and from about 2 weight percent to about 50 weight percent vinyl aromatic monomer plus other conjugated diene monomer, such as isoprene.

The distribution of repeat units in the copolymer and terpolymer rubbers is essentially random. The term "random" as used herein means that less than 10 percent of the total quantity of repeat units of a monomer are in blocks containing more than five repeat units. In other words, more than 90 percent of the repeat units are in blocks containing five or fewer repeat units. The copolymers and terpolymers also tend to have a consistent composition throughout their polymer chains. In other words, the content of a specific monomer of the polymer will be about the same from the beginning to the end of the polymer chain. For example, no segments of at least 100 repeat units within the polymer will have a styrene content which differs from the total styrene content of the polymer by more than about 10 percent.

The polymerizations of this invention are initiated by adding the catalyst system containing the organolithium amine compound to a polymerization medium, or premix, containing the monomers to be polymerized. The catalyst system may be added to the premix in any desired amount. In one example, the catalyst system is provided in an amount of about 0.100 mmole to about 0.900 mmol/per 100 parts by weight of total monomer. In another example, the catalyst system is provided in an amount of about 0.200 mmole to about 0.700 mmol/per 100 parts by weight of total monomer. The polymerizations can be carried out utilizing batch, semi-continuous or continuous techniques, as known to those having ordinary skill in the art.

The polymerization is conducted for a length of time sufficient to permit substantially complete polymerization of monomers. In other words, the polymerization is normally carried out until high conversions are attained. The polymerization temperature utilized can vary over a broad temperature range of from about 20° C. to about 180° C. In another example, a temperature within the range of about 40° C. to about 120° C. can be utilized. In yet another example, the polymerization temperature can be within the range of about 70° C. to about 100° C. The pressure used will normally be sufficient to maintain a substantially liquid phase under the conditions of the polymerization reaction.

After the polymerization has been completed, the rubbery polymer, which is functionalized and has a high trans microstructure content, can be recovered from the organic solvent. The rubbery polymer can be recovered from the organic solvent and residue by means such as decantation, filtration, centrifration, and others known to those having ordinary skill in the art. It can be desirable to precipitate the polymer from the organic solvent by the addition of lower alcohols containing from about 1 to about 4 carbon atoms to the polymer solution. Suitable lower alcohols for precipitation of the segmented polymer from the polymer cement include methanol, ethanol, isopropyl alcohol, normal-propyl alcohol and t-butyl alcohol. The utilization of lower alcohols to precipitate the rubber from the polymer cement also "kills" or terminates the living polymer by inactivating lithium end groups of the organolithium amine initiator compound. The polymerization can also be terminated with other conventional noncoupling types of terminators, such as water, an acid, or with a coupling agent, for example. After the polymer is recovered from the solution, steam-stripping can be employed to reduce the level of volatile organic compounds in the rubber.

There are certain benefits in tire tread compounds derived from the rubbery polymers made with the catalyst systems. For example, polybutadiene rubber, styrene-butadiene rubber, isoprene-butadiene rubber, or styrene-isoprene-butadiene rubber made with the catalyst system can be blended, for example, with natural rubber to make tread compounds for passenger tires that can exhibit desirable rolling resistance, traction, tear, and/or tread wear characteristics.

Non-limiting examples of the catalyst system, and use thereof, in accordance with the description are now disclosed below. These examples are merely for the purpose of illustration and are not to be regarded as limiting the scope of the invention or the manner in which it can be practiced. Other examples will be appreciated by a person having ordinary skill in the art. Unless specifically indicated otherwise, parts and percentages are given by weight.

Catalyst System Preparation

The catalyst system used in the anionic polymerization was preformed. Initially, a barium compound, i.e., a barium salt of di(ethylene glycol) ethylether (BaDEGEE) (37.33% in ethylbenzene), was alkylated with an aluminum alkyl, i.e., tri-n-octylaluminum (TOA) (50% in hexanes). The molar ratio of BaDEGEE to TOA was 1:4. The BaDEGEE/TOA catalyst was prepared by slowly adding TOA at a rate of about 1 lb/min to BaDEGEE in a 30-gallon reactor. The reactor temperature was set at about 24° C. to compensate for the exotherm from the reaction of TOA with the barium salt. After the TOA was added, the temperature was set to about 70° C. for thirty minutes to provide the alkylated barium catalyst. The catalyst was then transferred to a cylinder.

For anionic polymerization, just prior to initiation, N,N-dimethyl aminopropyllithium (N,DAPLi), i.e., $(CH_3)_2N(CH_2)_3Li$, (15% in hexanes) was added to the BaDEGEE/TOA catalyst so that the molar ratio of BaDEGEE to TOA to N,DAPLi was 1:4:3. After addition, the contents of the cylinder were transferred to a 5-gallon reactor, heated at about 70° C. for about 7 min to provide the catalyst system (BaDEGEE/TOA/N,DAPLi) for use in the Examples below.

EXAMPLES

In this experiment, 2000 g of a hexane premix containing about 20% monomer(s) of the type and in the relative amounts set forth in Table 1 was charged to a one gallon stainless steel reactor with an air-driven motor, a nitrogen inlet for providing an inert nitrogen atmosphere, and internal heating/cooling coils for temperature regulation. The catalyst system (BaDEGEE/TOA/N,DAPLi) was added to the premix in a ratio of 0.25 mmol of catalyst per 100 g of the monomer mixture. The molar ratio of BaDEGEE to TOA to N,DAPLi was 1:4:3. Optionally, in examples 3-6, 8-12, 14, and 16 in Table 1, 5 mL of 0.3M of a solution of pyrrolidine (X), piperidine (Y), tetramethylethylenediamine (Z), or butylamine (I) in hexanes is further included in the catalyst system prior to anionic polymerization. The molar ratio of BaDEGEE to TOA to N,DAPLi to amine was 1:4:3:2.

The polymerization was carried out at 90° C. and the reaction monitored using gas chromatography ("GC") to detect for the presence of unreacted monomers. After polymerization was completed, 10 ml ethanol was added to shortstop the polymerization. The polymer cement was then removed from the reactor and stabilized with antioxidant. After evaporating hexanes, the resulting polymer was dried in a vacuum oven. During polymerization, the amine of the organolithium amine compound had been chemically integrated into the rubbery polymer, as understood by one having ordinary skill in the art, to provide an amine functionalized rubbery polymer. That amine functionalized rubbery polymer was recovered and fully characterized using, for example, differential scanning calorimetry (DSC), nuclear magnetic resonance (NMR), and gel permeation chromatography (GPC) with the results, including glass transition temperature (Tg), melting temperature (Tm), Mooney viscosity (ML+4) at 100° C., average molecular weight (Mn), weight average molecular weight (Mw), and polydispersity (PDI), being listed in Table 1.

TABLE 1

| No. | Polymer | Initiator | Ratios | Tg (° C.) | Tm (° C.) | ML +4 | Mn (g/mol) | Mw (g/mol) | PDI |
|---|---|---|---|---|---|---|---|---|---|
| 1 | PBD | N,DAPLi | 1/4/3 | −92 | 33 | 110 | 190K | 390K | 1.91 |
| 2 | PBD | N,DAPLi | 1/4/3 | −92 | 34 | 98 | 174K | 250K | 1.40 |
| 3 | PBD | N,DAPLi | 1/4/3/X | −92 | 56 | 96 | 211K | 375K | 1.77 |
| 4 | PBD | N,DAPLi | 1/4/3/Y | −88 | 35 | 110 | 319K | 425K | 1.33 |
| 5 | PBD | N,DAPLi | 1/4/3/Z | −87.5 | 40 | 98 | 230K | 345K | 1.52 |
| 6 | PBD | N,DAPLi | 1/4/3/I | −89 | 31 | 76 | 95K | 160K | 1.69 |
| 7 | SBR 10% Styrene | N,DAPLi | 1/4/3 | −82 | 19 | 78 | 140K | 185K | 1.30 |
| 8 | SBR 10% Styrene | N,DAPLi | 1/4/3/X | −80 | 20 | 88 | 170K | 221K | 1.30 |
| 9 | SBR 10% Styrene | N,DAPLi | 1/4/3/Y | −84 | 19 | 97 | 180L | 253K | 1.40 |
| 10 | SBR 20% Styrene | N,DAPLi | 1/4/3/Z | −73 | 12 | 89 | 190K | 304K | 1.6 |
| 11 | SBR 25% Styrene | N,DAPLi | 1/4/3/Z | −67 | 5 | 88 | 210K | 315K | 1.5 |
| 12 | SBR 10% Styrene | N,DAPLi | 1/3/4/I | 88 | 17 | 76 | 150K | 300K | 2.0 |
| 13 | IBR 10% isoprene | N,DAPLi | 1/3/4 | −83 | 12 | 98 | 300K | 390K | 1.3 |
| 14 | IBR 10% isoprene | N,DAPLi | 1/4/3/X | −82 | 11 | 78 | 250K | 400K | 1.6 |
| 15 | SIBR 10/10/80 | N,DAPLi | 1/4/3 | −67 | 5 | 89 | 280K | 840K | 3 |
| 16 | SIBR 10/10/80 | N,DAPLi | 1/4/3/X | −77 | 3 | 78 | 270 | 535K | 1.98 |

N,DAPLi = Dimethylaminopropyllithium
X = Pyrrolidine
Y = Piperidine
Z = Tetramethylethylenediamine (TMEDA)
I = Butylamine Based on the Tg and Tm, the microstructure content of the amine functionalized polybutadiene rubber was predicted to be for Example 1, a trans 1,4 polybutadiene content of about 82%, cis 1,4 polybutadiene content of about 13%, and a 1,2 polybutadiene content of about 5%. Example 2 was predicted to include a trans 1,4 polybutadiene content of about 81%, cis 1,4 polybutadiene content of about 14%, and a 1,2 polybutadiene content of about 5%. Example 3 was predicted to include a trans 1,4 polybutadiene content of about 80%, cis 1,4 polybutadiene content of about 16%, and a 1,2 polybutadiene content of about 4%. Example 4 was predicted to include a trans 1,4 polybutadiene content of about 81%, cis 1,4 polybutadiene content of about 14%, and a 1,2 polybutadiene content of about 5%. Example 5 was predicted to include a trans 1,4 polybutadiene content of about 82%, cis 1,4 polybutadiene content of about 14%, and a 1,2 polybutadiene content of about 4%. Example 6 was predicted to include a trans 1,4 polybutadiene content of about 80%, cis 1,4 polybutadiene content of about 15%, and a 1,2 polybutadiene content of about 5%.

Based on the Tg and Tm, the microstructure content of the amine functionalized styrene-butadiene rubber was predicted to be for Example 7, a trans 1,4 polybutadiene content of about 80%, cis 1,4 polybutadiene content of about 15%, a 1,2 polybutadiene content of about 5%, and a polystyrene content of about 10%. Example 8 was predicted to include a trans 1,4 polybutadiene content of about 79%, cis 1,4 polybutadiene content of about 16%, a 1,2 polybutadiene content of about 5%, and a polystyrene content of about 15%. Example 9 was predicted to include a trans 1,4 polybutadiene content of about 80%, cis 1,4 polybutadiene content of about 15%, a 1,2 polybutadiene content of about 5%, and a polystyrene content of about 15%. Example 10 was predicted to include a trans 1,4 polybutadiene content of about 79%, cis 1,4 polybutadiene content of 16%, a 1,2 polybutadiene content of about 5%, and a polystyrene content of about 15%. Example 11 was predicted to include a trans 1,4 polybutadiene content of about 81%, cis 1,4 polybutadiene content of about 14%, a 1,2 polybutadiene content of about 5%, and a polystyrene content of about 15%. Example 12 was predicted to include a trans 1,4 polybutadiene content of about 80%, cis 1,4 polybutadiene content of about 16%, a 1,2 polybutadiene content of about 4%, and a polystyrene content of about 15%.

Based on the Tg and Tm, the microstructure content of the amine functionalized isoprene-butadiene rubber was predicted to be for Example 13, a trans 1,4 polybutadiene content of about 80%, cis 1,4 polybutadiene content of about 14%, 1,2 polybutadiene content of about 6%, cis 1,4 polyisoprene content of about 10%, trans 1,4 polyisoprene content of about 55%, and 3,4 polyisoprene content of about 35%. Example 14 was predicted to include a trans 1,4 polybutadiene content of about 80%, cis 1,4 polybutadiene content of about 16%, 1,2 polybutadiene content of about 5%, cis 1,4 polyisoprene content of about 55%, trans 1,4 polyisoprene content of about 40%, and 3,4 polyisoprene content of about 5%.

Based on the Tg and Tm, the microstructure content of the amine functionalized styrene-isoprene-butadiene rubber was predicted to be for Example 15, a trans 1,4 polybutadiene content of about 80%, cis 1,4 polybutadiene content of about 16%, a 1,2 polybutadiene content of about 4%, cis 1,4 polyisoprene content of about 40%, trans 1,4 polyisoprene content of about 40%, 3,4 polyisoprene content of about 20%, and polystyrene content of about 25%. Example 16 was predicted to include a trans 1,4 polybutadiene content of about 82%, cis 1,4 polybutadiene content of about 12%, 1,2 polybutadiene content of 6%, cis 1,4 polyisoprene content of about 40%, trans 1,4 polyisoprene content of about 40%, 3,4 polyisoprene content of about 20%, and polystyrene content of about 30%.

Accordingly, the solution polymerizations using the above catalyst systems produced amine functionalized polybutadiene rubber, styrene-butadiene rubber, isoprene-butadiene rubber, and styrene-isoprene-butadiene rubber having high trans microstructure contents as well as desirable glass transition temperatures, for example. Such glass transition temperatures from the above examples indicate low temperature properties. These low temperature properties can translate into rubber compounds with good wearing properties and desirable traction properties suitable for use in tires. The presence of a high trans microstructure content, i.e., greater than 70% of total microstructure of polybutadiene is trans 1,4 polybutadiene, is typically beneficial for providing desirable tearing properties which can give desirable endurance to truck tires, for example. Moreover, such crystallizable high-trans polymers can be useful in building tread rubbers in tire making equipment as a result of lower shrinkage and distortion of the tread compound on extrusion. The Mooney data, for example, indicates a rubbery polymer having better wearing and tearing which can be desirable in medium and heavy truck tires for better chipping and chunking. The polydispersity values indicate a rubbery polymer having a more desirable filler and polymer interaction during processing and calendaring, which can lead to improved fuel economies.

Accordingly, the amine functionalized rubbery polymer may be further compounded with additional ingredients to provide a rubber compound, such as for use in a tire tread for a tire, which may have the above desirable characteristics. Specifically selected additives may be provided in the rubber compound, such as, for example, fillers including 100% silica, 100% carbon black, and mixtures thereof and curing agents. Other additives may be added as desired including curing aids such as activators, retarders and accelerators, rubber processing oils, resins including tackifying resins, plasticizers, fatty acid, zinc oxide, waxes, antidegradant, antiozonants, and peptizing agents. These other additives, depending on the intended use of the rubber compound, are selected and used in conventional amounts.

The rubber compound, which includes, for example, the amine functionalized rubbery polymer having a high trans microstructure, silica, and curing agent, may be compounded by methods generally known in the rubber compounding art, such as by mixing the various constituent materials in the amounts listed above at a temperature in a range of from about 135° C. to about 180° C. to form a green rubber. The green rubber may be further formed into a tire tread and cured on a tire (not shown) by means well known in the art. Such rubber compound provides desirable wear properties without substantially sacrificing other performance characteristic(s), e.g., traction properties.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and method and illustrative examples shown and described. Accordingly, departures may be made from such details without departing from the scope of the general inventive concept.

What is claimed is:

1. A method comprising:
polymerizing one or more different types of conjugated diene monomers and optionally vinyl aromatic monomers in the presence of a catalyst system for synthesizing rubbery polymers that are amine functionalized and have a high trans microstructure comprising:
an organolithium amine compound defined by R'NR"Li, wherein R', together with the adjacent nitrogen, defines a heterocyclic aromatic amine group having 2 to 18 ring carbon atoms, and wherein R" is a divalent hydrocarbyl group that has 1 to 20 carbons;
a group IIa metal salt of an amino glycol or a glycol ether; and
an organoaluminum compound.

2. The method of claim 1 wherein polymerizing the conjugated diene monomer in the presence of the catalyst system includes polymerizing the vinyl aromatic monomer with the one or more different types of conjugated diene monomers, and wherein the vinyl aromatic monomer is styrene and the one or more different types of conjugated diene monomers is butadiene or butadiene and isoprene for synthesizing styrene-butadiene rubber or styrene-isoprene-butadiene that is amine functionalized and has a high trans microstructure.

3. The method of claim 1 wherein polymerizing the conjugated diene monomer in the presence of the catalyst system includes polymerizing the one or more different types of conjugated diene monomers, and wherein the one or more different types of conjugated diene monomers is butadiene or butadiene and isoprene for synthesizing polybutadiene rubber or isoprene-butadiene rubber that is amine functionalized and has a high trans microstructure.

4. A tire comprising:
a rubber compound including a rubbery polymer resulting from the method comprising polymerizing one or more different types of conjugated diene monomers and optionally vinyl aromatic monomers in the presence of a catalyst system for synthesizing rubbery polymers that are amine functionalized and have a high trans microstructure comprising:
an organolithium amine compound defined by R'NR"Li, wherein R', together with the adjacent nitrogen, defines a heterocyclic aromatic amine group having 2 to 18 ring carbon atoms, and wherein R" is a divalent hydrocarbyl group that has 1 to 20 carbons;
a group IIa metal salt of an amino glycol or a glycol ether; and
an organoaluminum compound.

5. The tire of claim 4 wherein the rubber compound further comprises silica filler, carbon black filler, or mixtures thereof.

6. The method of claim 1, wherein the heterocyclic aromatic amine group is a substituted or unsubstituted 3-, 4-, 5-, or 6-membered ring structure with one or more nitrogen atoms as part of the ring, and R" is a divalent hydrocarbyl group that has 1 to 5 carbon atoms.

7. The method of claim 1, wherein the heterocyclic aromatic amine is selected from the group consisting of pyrrole, quinoline, pyridine, 2-picoline, 3-picoline, 4-picoline, pyridazine, pyrimidine and pyrazine.

8. The tire of claim 4 wherein the heterocyclic aromatic amine is selected from the group consisting of pyrrole, quinoline, pyridine, 2-picoline, 3-picoline, 4-picoline, pyridazine, pyrimidine and pyrazine.

9. The tire of claim 4, wherein polymerizing the conjugated diene monomer in the presence of the catalyst system includes polymerizing the vinyl aromatic monomer with the one or more different types of conjugated diene monomers, and wherein the vinyl aromatic monomer is styrene and the one or more different types of conjugated diene monomers is butadiene or butadiene and isoprene for synthesizing styrene-butadiene rubber or styrene-isoprene-butadiene that is amine functionalized and has a high trans microstructure.

10. The tire of claim 4, wherein polymerizing the conjugated diene monomer in the presence of the catalyst system includes polymerizing the one or more different types of conjugated diene monomers, and wherein the one or more different types of conjugated diene monomers is butadiene or butadiene and isoprene for synthesizing polybutadiene rubber or isoprene-butadiene rubber that is amine functionalized and has a high trans microstructure.

11. The tire of claim 4, wherein the heterocyclic aromatic amine group is a substituted or unsubstituted 3-, 4-, 5-, or 6-membered ring structure with one or more nitrogen atoms as part of the ring, and R" is a divalent hydrocarbyl group that has 1 to 5 carbon atoms.

* * * * *